Figure 1:
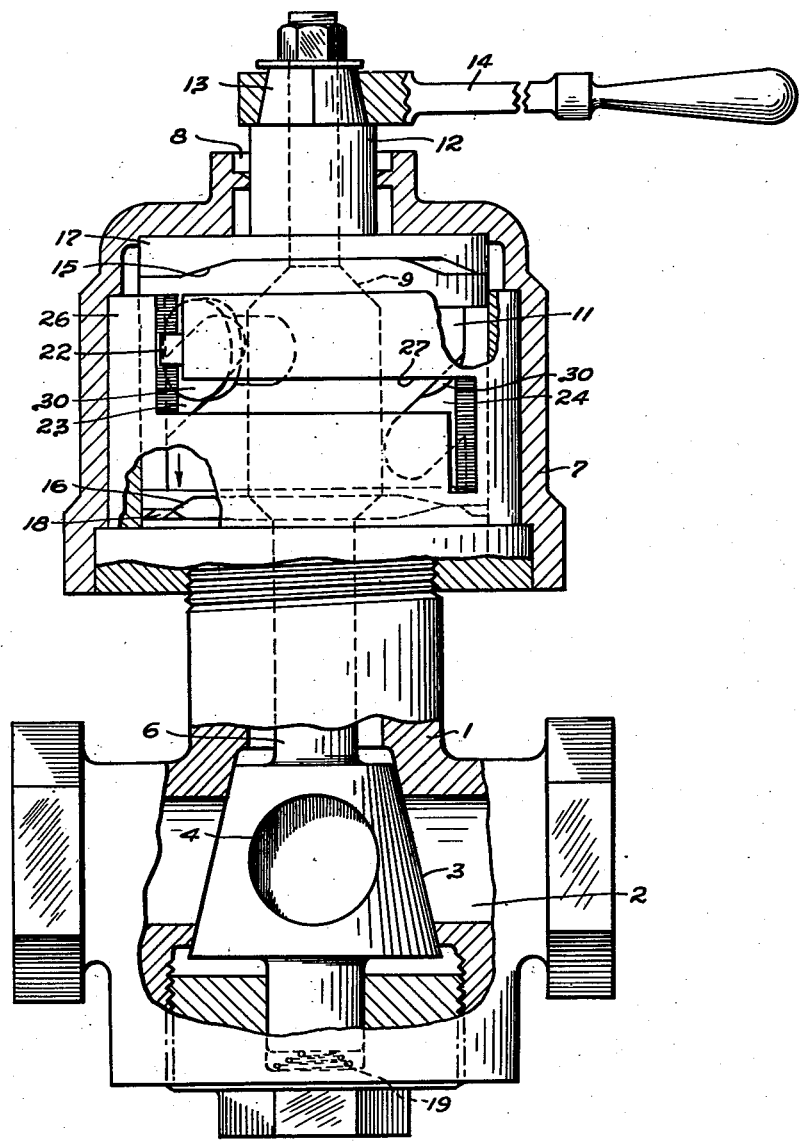

Dec. 25, 1951 C. W. ANDERSON 2,580,212
PLUG VALVE ACTUATOR

Original Filed Nov. 16, 1943 4 Sheets-Sheet 1

WITNESSES.
E. J. Maloney
V. A. Peckham.

INVENTOR.
Clayton W. Anderson
BY Brown, Critchlow & Flick
his ATTORNEYS.

Dec. 25, 1951   C. W. ANDERSON   2,580,212
PLUG VALVE ACTUATOR

Original Filed Nov. 16, 1943   4 Sheets-Sheet 2

INVENTOR.
Clayton W. Anderson
BY Brown, Critchlow & Flick
his ATTORNEYS.

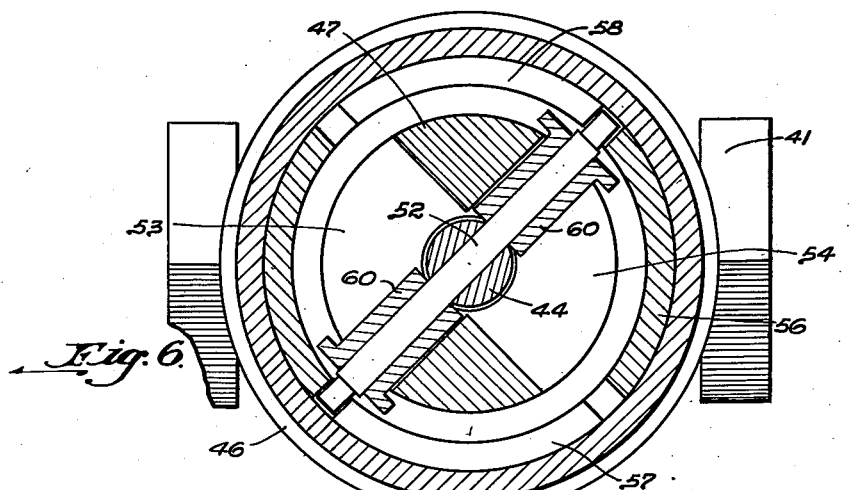
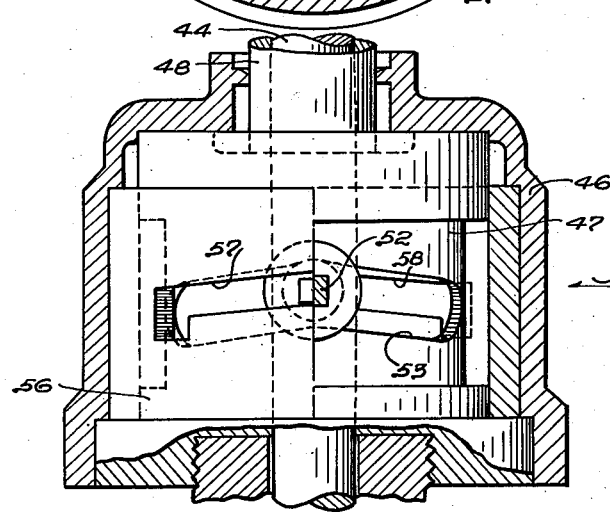
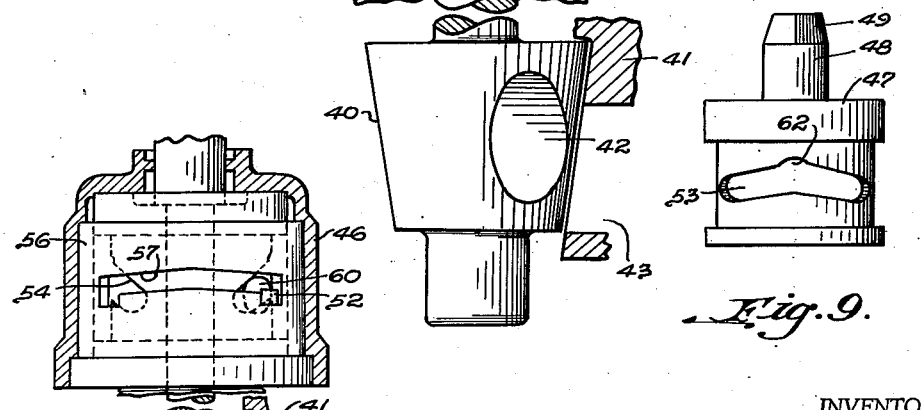
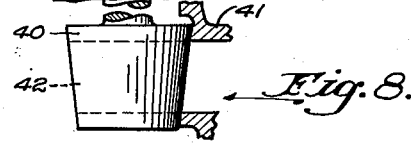

Patented Dec. 25, 1951

2,580,212

UNITED STATES PATENT OFFICE 2,580,212

PLUG VALVE ACTUATOR

Clayton W. Anderson, East Huntingdon Township, Pa., assignor to Kathryn Schmidt Anderson, Scottdale, Pa.

Substituted for application Serial No. 510,450, November 16, 1943. This application February 18, 1948, Serial No. 9,112

10 Claims. (Cl. 74—22)

This invention relates to plug valves, and more particularly to those in which a tapered or conical plug is moved axially from its seat before it is rotated and is returned to its seat after it is rotated. This application is a substitute for my identical forfeited application Serial Number 510,450, filed November 16, 1943, and allowed June 14, 1945.

It is among the objects of this invention to provide a plug valve which is quickly unseated, rotated, and seated again by continuous movement of the same operating means in the same direction; and which is of relatively simple and inexpensive construction.

In accordance with this invention a tapered valve plug is mounted in a valve casing for rotary and axial movements. There is a stem at one end of the plug around which a cylindrical sleeve is rotatable and which is provided in its side wall with a pair of circumferentially spaced inclined slots. A stationary member encircles the sleeve and is provided in its side wall with a pair of circumferentially extending slots which are substantially horizontal and each of which has a vertical extension at each end normally beside an end of an inclined slot. A connecting member is mounted on the stem which extends through the inclined slots and normally into a pair of the slot extensions. Means is provided for rotating the sleeve in the stationary member whereupon the connecting member is moved vertically and the plug is unseated while the engagement of the connecting member with the walls of the slot extensions temporarily prevents the plug and stem from turning. In one form of the invention the vertical extension at one end of each of the slots in the stationary member projects upwardly normally beside the upper end of one of the inclined slots which appear straight when viewed from the side, and the other extensions project downwardly normally beside the lower ends of the inclined slots. Also, the connecting member is mounted on the valve stem for limited vertical movement thereon. Means is provided for moving the sleeve vertically when it is first turned, and the sleeve is connected to the stem in such a way as to move the stem vertically with it to unseat the plug. However, the plug and stem are prevented temporarily from turning by engagement of the connecting member with the walls of the slot extensions. In another embodiment of the invention each of the inclined slots slopes away from its center portion in the same direction, and the vertical extensions on the slots in the stationary member all project in the same direction. The connecting member is secured to the valve stem so that when the slots in the rotatable sleeve raise the connecting member it moves the plug off its seat, but the sleeve does not move vertically.

Figure 2:
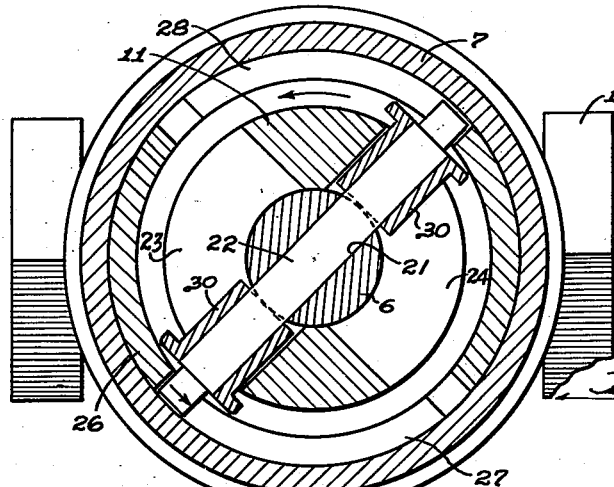
Figure 3:
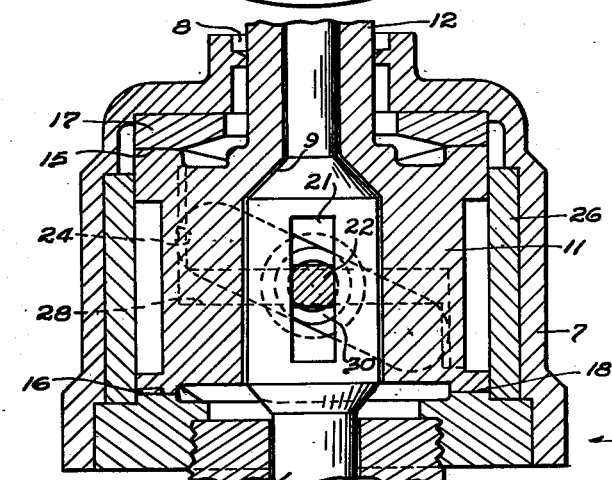
Figure 4:
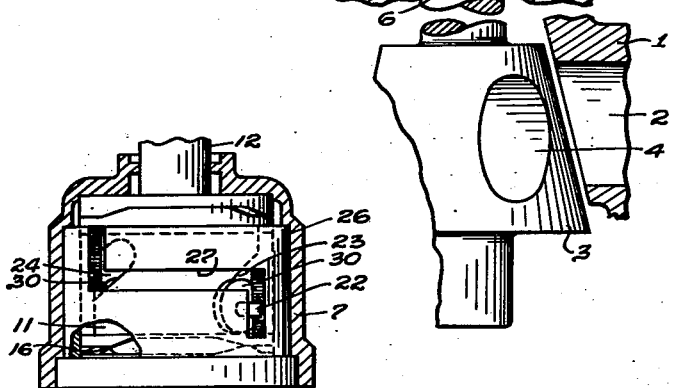
Figure 5:
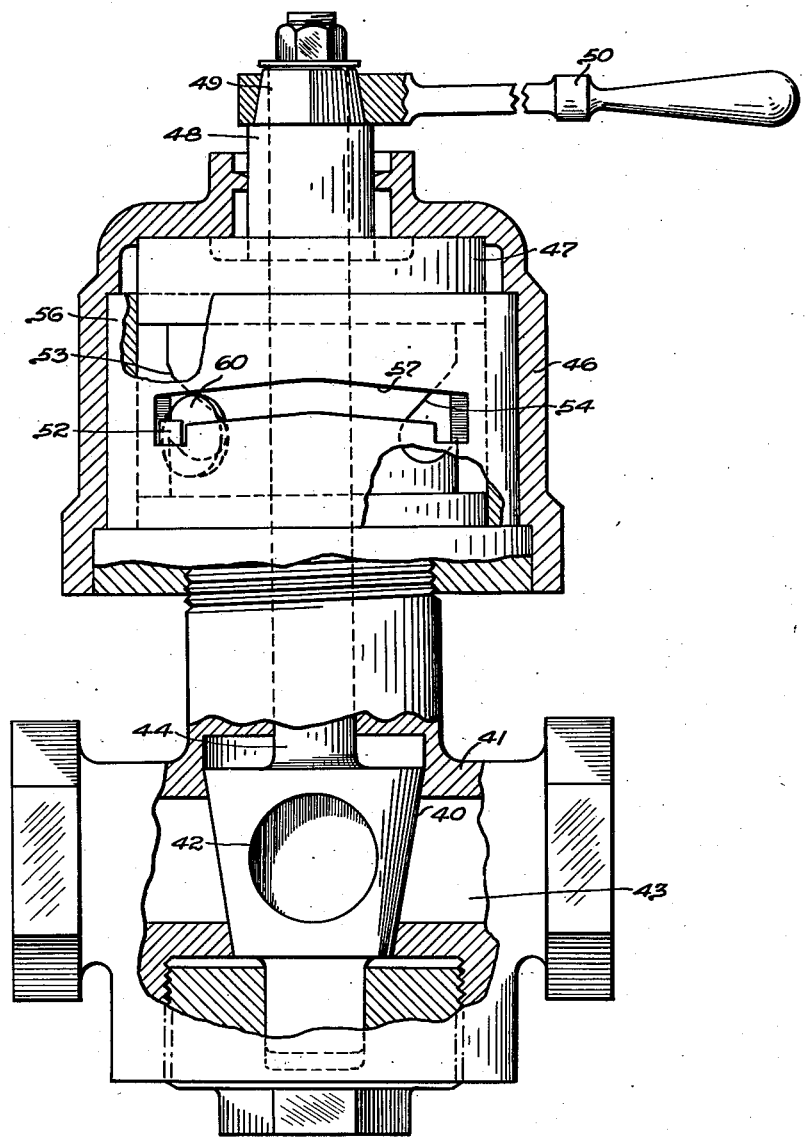

The invention is illustrated in the accompanying drawings in which Fig. 1 is a side view, mostly broken away, of one embodiment showing the plug seated and closed; Fig. 2 is a horizontal section taken through the slots of Fig. 1; Fig. 3 is a fragmentary central vertical section with the plug unseated and half way open; Fig. 4 is a reduced fragmentary view indicating the position of the operating parts when the plug is seated in its open position; Figs. 5 and 6 are views like Figs. 1 and 2 of a modified embodiment of the invention; Fig. 7 is a view similar to Fig. 3 but only partly in section; Fig. 8 is a view similar to Fig. 4; and Fig. 9 is a side view of the rotatable sleeve alone.

Referring to Figs. 1 and 2 of the drawings, a valve casing 1 is provided with the usual passage 2 in which there is an upwardly tapered valve plug 3 provided with a transverse passage 4. Rigidly connected to the top of the plug is a valve stem 6 that extends up above the casing. Rigidly mounted on top of the casing is a cylindrical dome-like housing 7 having a central opening 8 in its upper end through which the valve stem extends. The portion of the stem inside this housing is enlarged to provide a tapered shoulder 9 at the upper end of the enlargement. Encircling the stem in the housing is a sleeve 11 that is rotatable around the stem. The upper end of the sleeve extends inwardly over stem shoulder 9 and then upwardly to form a cylindrical extension 12 of the sleeve that projects above the housing. The upper end of this extension may be provided with a squared, tapered portion 13 to receive a handle 14 or wrench or any other device for turning the sleeve.

The upper and lower ends of the sleeve are provided with integral cam surfaces 15 and 16 that cooperate, respectively, with a cam 17 rigidly mounted in the top of the housing and a cam 18 rigidly mounted in the bottom of the housing. These cam surfaces are so shaped that when the sleeve is turned they will move it downwardly so that it will, through engagement with stem shoulder 9, push the stem down to unseat the plug. The sleeve is rotated 180° in opening the valve. During the first 45° rotation the plug is unseated as just described, and during the last 45° rotation the lower cams raise the sleeve to its upper position, a spring 19 at the bottom of the plug simultaneously lifting the plug to its seat. During the intermediate 90° rotation of the sleeve it turns the plug 90° by means of a connection about to be described.

To keep the plug from rotating while it is being unseated and seated, so that it will not grind on its seat, and yet to cause it to be turned 90° by sleeve 11 while unseated, the enlarged portion of the valve stem in housing 7 is provided with a vertical slot 21 extending transversely therethrough as shown in Figs. 2 and 3. A cross pin 22 extends horizontally through this slot in which it can be moved vertically. Extending through the side wall of the sleeve on opposite sides of its axis is a pair of circumferentially spaced slots 23 and 24 that are straight and inlined about 30°, but the degree of inclination is not critical. Encircling the sleeve is a cylindrical member or ring 26 that is rigidly mounted in the housing. This ring is provided in its side wall with a pair of circumferentially spaced horizontal slots 27 and 28 each of which has an upward extension at one end normally beside the upper end of one of the inclined slots, and a downward extension at the other end normally beside the lower end of the other inclined slot, as shown in Figs. 1 and 2. The cross pin extends from the valve stem through the inclined slots in the sleeve and into the slots in the surrounding ring. Each of the inclined and the horizontal slots is long enough to permit the cross pin to be turned through a 90° arc. Preferably, rollers 30 are rotatably mounted on the pin in the inclined slots to provide anti-friction bearings.

The normal position of the pin, that is, the position it occupies when the plug is seated, is at either the top or the bottom of the vertical slot through the valve stem. In either position, the valve may be either open or closed. The drawing (Fig. 1) shows the valve closed when the pin is at the top of the slot. The inclined slots in the sleeve extend from a plane slightly above the top of the stem slot to a plane slightly below the bottom of that slot.

Assuming that the valve is closed with the movable parts in the positions shown in Figs. 1 and 2, the handle 14 must be swung in a counter-clockwise direction in order to open the valve. This will turn the sleeve and immediately the cams 15 and 17 at its upper end will start to move it downwardly in stationary ring 26. This downward movement continues during 45° of rotation, and during that time the sleeve pushes the valve plug from its seat. However, while the plug is being unseated it can not turn on its seat, because cross pin 22 in the valve stem is projecting into the upper extensions of ring slots 27 and 28 which prevent the pin and stem from rotating with the sleeve. On the other hand, during this lowering and initial turning of the sleeve the upper walls of its inclined slots are moving the pin downwardly in the ring slots.

By the time the sleeve has been turned 45° and the plug is fully unseated, the pin has emerged from the upper extensions of the ring slots and therefore is no longer prevented from turning with the sleeve. In fact, during the next 90° rotation of the sleeve the pin has to move with it along the horizontal slots because it can not move downwardly any farther. This horizontal movement of the pin turns the stem and plug until passage 4 through the plug is substantially in line with passage 2 through the valve casing. The rotation of the plug is then stopped by the engagement of the ends of the pin with the end walls of the horizontal slots. There is nothing to stop the sleeve from turning, however, and during its next 45° rotation the cams 16 and 18 at its lower end move it upwardly in housing 7. The cross pin, which can not turn any farther with the sleeve, is moved by the inclined slots down into the downward extensions of the ring slots until the pin strikes the bottom of stem slot 21. This stops the rotation of the sleeve which is then in its upper position with the plug in seated but open position.

When the sleeve is turned the opposite direction in order to close the valve, the above cycle of operation is reversed. Thus, the cross pin first moves up out of the downward extensions of the ring slots while the plug is being unseated by the downwardly moving sleeve, then turns with the sleeve in a clockwise direction to turn the plug to closed position, and then the pin moves upwardly into the upper extensions of the ring slots while the plug rises to its seat. All of this occurs while handle 14 is being turned 180° in a clockwise direction.

In the modification shown in Figs. 5 to 9 a downwardly tapered valve plug 40 (Fig. 5) is rotatably mounted in a valve casing 41 in which it also is movable axially. The passage 42 through the plug is adapted to register with the passage 43 through the casing when the valve is open. The stem 44 extends up through a cylindrical dome-like housing 46 rigidly mounted on top of the casing. Encircling the stem inside the housing is a rotatable sleeve 47 that engages the top and bottom of the housing so that the sleeve cannot move axially. The upper end of the sleeve is provided with a reduced cylindrical extension 48 that projects above the housing. The upper end of this extension may be provided with a squared, tapered portion 49 or the like to receive an operating handle 50 or any other suitable device for turning the sleeve 180° to open or close the valve.

To raise the plug from its seat and yet prevent it from rotating while this is occurring, a cross pin 52 (Fig. 6) extends horizontally through the stem in which it is rigidly mounted. Extending through the side wall of the sleeve on opposite sides of its axis is a pair of circumferentially spaced slots 53 and 54 each of which is in the form of a flattened inverted V, that is, it is inclined downwardly away from its center toward both ends as shown in Fig. 9. Encircling the sleeve is a cylindrical member or ring 56 that is rigidly mounted in the housing. This ring is provided in its side wall with a pair of circumferentially spaced, nearly horizontal slots 57 and 58 each of which is slightly higher at its center than at its ends. Each of the ring slots has downward extensions or notches at both ends, each of these notches being located normally beside one end of each of the inclined sleeve slots as shown in Figs. 1 and 2. The cross pin extends from the valve stem through the inclined slots in the sleeve and into the slots in the surrounding ring. Each of the sleeve and ring slots is long enough to permit the cross pin to be turned through a 90° arc. Preferably, rollers 60 are rotatably mounted on the pin in the sleeve slots to provide anti-friction bearings. The normal position of the pin is with its ends located in the notches at the ends of the ring slots. In this position the valve may be either open or closed, depending upon which pair of notches the pin is engaging.

Assuming that the valve is closed with the movable parts in the positions shown in Figs. 5 and 6, the operating handle 50 must be swung in a counterclockwise direction in order to open the valve. This will turn sleeve 47, and the inclined lower walls of sleeve slots 53 and 54 will start to move the ends of the cross pin up out of the ring slot notches. This will continue during the first 45° rotation of the sleeve. Elevation of the cross pin in this manner raises the valve stem and thereby lifts the plug from its seat. The plug can not turn while it is being unseated, because the cross pin is held against turning by the side walls of the ring slot notches.

By the time the sleeve has been turned 45° and the plug is fully unseated, the cross pin has emerged from the ring slot notches and therefore is no longer prevented from turning with the sleeve. The moment the ends of the pin start to engage the slightly inclined bottom walls of the ring slots the rollers 60 are started up into shallow recesses 62 at the apexes of the sleeve slots. These recesses help hold the rollers and pin at the centers of the sleeve slots as the pin is moved from one end of the ring slots to the other. Fig. 7 of the drawing shows the cross pin at its highest point in the sleeve and ring slots, which is at their centers with the valve half open. This lateral movement of the pin along the ring slots turns the valve stem and plug until the passage through the plug is substantially in line with the passage through the valve casing. The rotation of the plug is then stopped by the engagement of the ends of the pin with the end walls of the ring slots. There is nothing to stop the sleeve from turning, however, and during its next 45° rotation the inclined upper walls of the sleeve slots move the ends of the pin down into the ring slot notches as shown in Fig. 8. When the pin reaches the bottoms of these notches the sleeve can be rotated no farther, but by then the plug is seated in open position. To close the valve the above cycle of operation is reversed.

It will be understood that the two valve plugs illustrated herein could be tapered in the opposite direction, and then the plug of Fig. 1 lifted from its seat and the plug of Fig. 5 pushed from its seat by turning the ring and sleeve slots bottom side up. The operating mechanisms would function as before, but the movements of the cross pins and valve stems would be reversed.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

1. Operating mechanism for a valve having a casing containing a rotatable and axially movable plug, said mechanism comprising a vertical stem, a rotatable and axially movable cylindrical sleeve encircling said stem and provided in its side wall with a pair of circumferentially spaced inclined slots, said sleeve being connected to the stem for moving the stem axially, a stationary member concentric with the sleeve and provided in its side wall with a pair of circumferentially spaced horizontal slots, each of said horizontal slots having an upward extension at one end normally beside the upper end of one of the inclined slots and a downward extension at the other end normally beside the lower end of the other inclined slot, a connecting member mounted on said stem for limited vertical movement thereon and extending into said inclined slots and normally into a pair of said horizontal slot extensions, means for rotating said sleeve relative to said stationary member, and means for moving the sleeve axially when it is first turned while the stem is prevented from turning by engagement of said connecting member with the walls of said slot extensions.

2. Operating mechanism for a valve having a casing containing a rotatable and axially movable plug, said mechanism comprising a vertical stem, a rotatable and axially movable cylindrical sleeve encircling said stem and provided in its side wall with a pair of circumferentially spaced inclined slots, said sleeve being connected to the stem for moving the stem axially, a stationary member encircling the sleeve and provided in its side wall with a pair of circumferentially spaced horizontal slots, each of said horizontal slots having an upward extension at one end normally beside the upper end of one of the inclined slots and a downward extension at the other end normally beside the lower end of the other inclined slot, a connecting member mounted on said stem for limited vertical movement thereon and extending through said inclined slots and normally into a pair of said horizontal slot extensions, means for rotating said sleeve in said stationary member, and means for moving the sleeve axially when it is first turned while the stem is prevented from turning by engagement of said connecting member with the walls of said slot extensions.

3. Operating mechanism for a valve having a casing containing a rotatable and axially movable plug, said mechanism comprising a vertical stem, a rotatable and axially movable cylindrical sleeve encircling said stem and provided in its side wall with a pair of circumferentially spaced inclined slots, said sleeve being connected to the stem for moving the stem axially, a stationary member encircling the sleeve and provided in its side wall with a pair of circumferentially spaced horizontal slots, each of said horizontal slots having an upward extension at one end normally beside the upper end of one of the inclined slots and a downward extension at the other end normally beside the lower end of the other inclined slot, a connecting member mounted on said stem for limited vertical movement thereon and extending through said inclined slots and normally into a pair of said horizontal slot extensions, means for rotating said sleeve in said stationary member, means for moving the sleeve axially when it is first turned while the stem is prevented from turning by engagement of said connecting member with the walls of said slot extensions, and means for moving the sleeve axially back to its original position after it has been rotated.

4. Operating mechanism for a valve having a casing containing a rotatable and axially movable plug, said mechanism comprising a vertical stem, a rotatable and axially movable cylindrical sleeve encircling said stem and provided in its side wall with a pair of circumferentially spaced inclined slots, said sleeve being connected to the stem for moving the stem axially, a stationary member encircling the sleeve and provided in its side wall with a pair of circumferentially spaced horizontal slots, each of said horizontal slots having an upward extension at one end normally beside the upper end of one of the inclined slots and a downward extension at the other end normally beside the lower end of the other inclined slot, a connecting member mounted on said stem for limited vertical movement thereon and extending through said inclined slots and normally into a pair of said horizontal slot extensions, means for rotating said sleeve in said stationary member, and a stationary cam at one end of the sleeve for moving it axially when it is first turned while the stem is prevented from turning by engagement of said connecting member with the walls of said slot extensions.

5. Operating mechanism for a valve having a casing containing a rotatable and axially movable plug, said mechanism comprising a vertical stem, a rotatable and axially movable cylindrical sleeve encircling said stem and provided in its side wall with a pair of circumferentially spaced inclined slots, said sleeve being connected to the stem for moving the stem axially, a stationary member encircling the sleeve and provided in its side wall with a pair of circumferentially spaced horizontal slots, each of said horizontal slots having an upward extension at one end normally beside the upper end of one of the inclined slots and a downward extension at the other end normally beside the lower end of the other inclined slot, a connecting member mounted on said stem for limited vertical movement thereon and extending through said inclined slots and normally into a pair of said horizontal slot extensions, means for rotating said sleeve in said stationary member, the upper and lower ends of said sleeve being provided with cam surfaces, and stationary cams at the opposite ends of said sleeve cooperating with said cam surfaces for moving the sleeve axially in one direction when it is first turned and in the opposite direction at the conclusion of its rotation, whereby to move the stem axially.

6. Operating mechanism for a valve having a casing containing a rotatable and axially movable plug, said mechanism comprising a vertical stem provided with a vertical slot extending transversely therethrough, a rotatable and axially movable cylindrical sleeve encircling said stem and provided in its side wall with a pair of circumferentially spaced inclined slots, said sleeve being connected to the stem for moving the stem axially, a stationary member encircling the sleeve and provided in its side wall with a pair of circumferentially spaced horizontal slots, each of said horizontal slots having an upward extension at one end normally beside the upper end of one of the inclined slots and a downward extension at the other end normally beside the lower end of the other inclined slot, a cross pin extending through said stem slot and inclined slots and normally projecting into a pair of said horizontal slot extensions, means for rotating said sleeve in said stationary member, and means for moving the sleeve axially when it is first turned while the stem is prevented from turning by engagement of said pin with the walls of said slot extensions.

7. Operating mechanism for a valve having a casing containing a rotatable and axially movable plug, said mechanism comprising a vertical stem provided with a vertical slot extending transversely therethrough, a rotatable and axially movable cylindrical sleeve encircling said stem and provided in its side wall with a pair of circumferentially spaced inclined slots, said sleeve being connected to the stem for moving the stem axially, a stationary member encircling the sleeve and provided in its side wall with a pair of circumferentially spaced horizontal slots, each of said horizontal slots having an upward extension at one end normally beside the upper end of one of the inclined slots and a downward extension at the other end normally beside the lower end of the other inclined slot, a cross pin extending through said stem slot and inclined slots and normally projecting into a pair of said horizontal slot extensions, rollers rotatably mounted on said pin in the inclined slots for engagement with the walls of the inclined slots, means for rotating said sleeve in said stationary member, and means for moving the sleeve axially when it is first turned while the stem is prevented from turning by engagement of said pin with the walls of said slot extensions.

8. Operating mechanism for a valve having a casing containing a rotatable and vertically movable plug, said mechanism comprising a vertical stem provided with an annular shoulder, a rotatable and axially movable cylindrical sleeve encircling said stem and having a portion engaging said shoulder, said sleeve being provided in its side wall with a pair of circumferentially spaced inclined slots, a stationary member encircling the sleeve and provided in its side wall with a pair of circumferentially spaced horizontal slots, each of said horizontal slots having an upward extension at one end normally beside the upper end of one of the inclined slots and a downward extension at the other end normally beside the lower end of the other inclined slot, a connecting member mounted on said stem for limited vertical movement thereon and extending through said inclined slots and normally into a pair of said horizontal slot extensions, means for rotating said sleeve in said stationary member, and means for moving the sleeve axially against said stem shoulder when it is first turned, whereby to move the stem axially while the stem is prevented from turning by engagement of said connecting member with the walls of said slot extensions.

9. Operating mechanism for a valve having a casing containing a rotatable and axially movable plug, said mechanism comprising a vertical stem, a rotatable and axially movable cylindrical sleeve encircling said stem and provided in its side wall with a pair of circumferentially spaced inclined slots, said sleeve being connected to the stem for moving the stem axially, said sleeve having an upwardly projecting extension of reduced diameter, a housing rigidly mounted on said casing and enclosing the sleeve, said housing having a top opening through which said sleeve extension and stem project, a cylindrical member rigidly mounted inside of said housing and encircling the sleeve, said member being provided in its side wall with a pair of circumferentially spaced horizontal slots, each of said horizontal slots having an upward extension at one end normally beside the upper end of one of the inclined slots and a downward extension at the other end normally beside the lower end of the other slot, a connecting member mounted on said stem for limited vertical movement thereon and extending through said inclined slots and normally into a pair of said horizontal slot extensions, means for rotating said sleeve extension, and cam means in one end of said housing for moving the sleeve axially when it is first turned while the stem is prevented from turning by engagement of said connecting member with the walls of said slot extensions.

10. Operating mechanism for a valve having a casing containing a rotatable and axially movable plug, said mechanism comprising a vertical stem, a rotatable and axially movable cylindrical sleeve encircling said stem and provided in its side wall with a pair of circumferentially spaced inclined slots, said sleeve being connected to the stem for moving the stem axially, a stationary member encircling the sleeve and provided in its side wall with a pair of circumferentially spaced horizontal slots, each of said horizontal slots having an upward extension at one end normally beside the upper end of one of the inclined slots and a downward extension at the other end normally beside the lower end of the other inclined slot, a connecting member mounted on said stem for limited vertical movement thereon and extending through said inclined slots and normally into a pair of said horizontal slot extensions, means for rotating said sleeve 180° in said stationary member, said slots being long enough to permit said connecting member to be turned 90° by said sleeve, and means for moving the sleeve axially while it is being turned the first 45° while the stem is prevented from turning by engagement of said connecting member with the walls of said slot extensions.

CLAYTON W. ANDERSON.

REFERENCES CITED

The following references are of record in the file of this patent:

UNITED STATES PATENTS

| Number | Name | Date |
|---|---|---|
| 2,443,995 | Snyder | June 22, 1948 |